United States Patent
Cornu et al.

(10) Patent No.: US 9,372,110 B2
(45) Date of Patent: Jun. 21, 2016

(54) SENSOR PACKAGE FOR WIM SENSOR AND WIM SENSOR

(71) Applicant: KISTLER HOLDING AG, Winterthur (CH)

(72) Inventors: David Cornu, Bellinzona (CH); Adrian Hofmann, Ellikon Am Rhein (CH); Peter Frei, Pfaeffikon ZH (CH)

(73) Assignee: KISTLER HOLDING AG, Winterthur (CH)

( * ) Notice: Subject to any disclaimer, the term of this patent is extended or adjusted under 35 U.S.C. 154(b) by 0 days.

(21) Appl. No.: 14/368,388

(22) PCT Filed: Jan. 11, 2013

(86) PCT No.: PCT/CH2013/000005
§ 371 (c)(1),
(2) Date: Jun. 24, 2014

(87) PCT Pub. No.: WO2013/104080
PCT Pub. Date: Jul. 18, 2013

(65) Prior Publication Data
US 2014/0345955 A1    Nov. 27, 2014

(30) Foreign Application Priority Data

Jan. 11, 2012   (CH) .......................................... 47/12

(51) Int. Cl.
*G01G 19/02* (2006.01)
*G01G 21/28* (2006.01)
*G01G 3/13* (2006.01)

(52) U.S. Cl.
CPC ................ *G01G 19/024* (2013.01); *G01G 3/13* (2013.01); *G01G 21/28* (2013.01)

(58) Field of Classification Search
CPC ... G01G 19/02; G01G 19/021; G01G 19/022; G01G 19/024; G01G 19/025; G01G 19/027; G01G 19/028; G01G 19/035; G01G 19/07; G01G 3/13; G01G 3/14; G01G 21/28; G01L 1/16
See application file for complete search history.

(56) References Cited

U.S. PATENT DOCUMENTS 4,597,151 A    7/1986   Zaghi et al.
4,793,429 A *  12/1988  Bratton et al. ............ 177/210 C
(Continued)

FOREIGN PATENT DOCUMENTS

CH    394637    6/1965
CH    702257    5/2011
(Continued)

OTHER PUBLICATIONS

International Preliminary Report on Patentability for PCT/CH2013/000005, issued Jun. 15, 2014.
(Continued)

*Primary Examiner* — Peter Macchiarolo
*Assistant Examiner* — Natalie Huls
(74) *Attorney, Agent, or Firm* — Dority & Manning, P.A.

(57) ABSTRACT

The invention relates to a sensor package (6) with long design for a WIM (Weigh in Motion) sensor (1), comprising a first receiving plate (7), a plurality of measuring elements (10), which are arranged equally spaced in a row (15) on the upper side (9) of the first receiving plate (7), an electrode (11) covering all the measuring elements (10), insulation (12) completely covering the electrode (11), and a second receiving plate (8), which covers the insulation (12). In particular, each receiving plate (7, 8) consists of a plurality of receiving elements (13) the end faces (14) of which are juxtaposed in a row (15). According to the invention, the inner end faces (14) of the receiving elements (13) of at least one row (15) have profiles (16) which engage in a form fit manner with the profiles (16) of the adjacent end faces (14) of neighboring receiving elements (13). The invention further relates to a WIM sensor (1) comprising a hollow profile (3) with a tube (4) and two opposing mountings (5) arranged therein, between which a sensor package (6) according to the invention is arranged under initial tension.

18 Claims, 2 Drawing Sheets

(56) References Cited

U.S. PATENT DOCUMENTS

| | | | |
|---|---|---|---|
| 4,799,381 A * | 1/1989 | Tromp | 73/146 |
| 5,265,481 A * | 11/1993 | Sonderegger et al. | 73/862.625 |
| 5,345,428 A | 9/1994 | Arnold et al. | |
| 5,461,924 A * | 10/1995 | Calderara et al. | 73/786 |
| 5,501,111 A * | 3/1996 | Sonderegger et al. | 73/862.642 |
| D370,423 S | 6/1996 | Nagai et al. | |
| D370,424 S | 6/1996 | Nagai et al. | |
| D373,738 S | 9/1996 | Nagai et al. | |
| 5,554,907 A * | 9/1996 | Dixon | 310/339 |
| D386,431 S | 11/1997 | Nagai et al. | |
| D386,702 S | 11/1997 | Nagai et al. | |
| 5,717,390 A | 2/1998 | Hasselbring | |
| 5,942,681 A * | 8/1999 | Vollenweider et al. | 73/146.2 |
| 6,112,600 A * | 9/2000 | Sonderegger | 73/841 |
| 6,301,544 B1 * | 10/2001 | Sonderegger | 701/117 |
| 6,459,050 B1 | 10/2002 | Muhs | |
| D469,886 S | 2/2003 | Barnett | |
| 6,595,064 B2 | 7/2003 | Drewes et al. | |
| 6,706,976 B1 * | 3/2004 | Schuler | 177/126 |
| D550,861 S | 9/2007 | Brabeck et al. | |
| 7,423,225 B1 * | 9/2008 | Kroll et al. | 177/132 |
| D684,075 S | 6/2013 | Cornu | |
| D686,928 S | 7/2013 | Cornu | |
| 2002/0014124 A1 | 2/2002 | Drewes et al. | |
| 2003/0168858 A1 * | 9/2003 | Hashem | 285/334 |
| 2009/0058663 A1 * | 3/2009 | Joshi et al. | 340/584 |
| 2011/0232974 A1 | 9/2011 | Abercrombie et al. | |
| 2014/0251700 A1 * | 9/2014 | Cornu et al. | 177/136 |
| 2015/0075297 A1 * | 3/2015 | Cornu et al. | 73/862.642 |

FOREIGN PATENT DOCUMENTS

| | | |
|---|---|---|
| EP | 0259523 | 3/1988 |
| EP | 0491655 | 6/1992 |
| EP | 0 654 654 | 4/1995 |
| EP | 0 892 259 | 1/1999 |
| WO | WO 01/22044 A1 | 3/2001 |
| WO | WO 02/08712 | 1/2002 |
| WO | WO 03/071242 | 8/2003 |

OTHER PUBLICATIONS

International Search Report for PCT/CH2013/000005, issued Feb. 11, 2013.

International Preliminary Report on patentability for PCT/CH2012/000149, issued Jan. 7, 2014.

International Search Report for PCT/CH2012/000134, issued Jul. 31, 2012.

International Preliminary Report on Patentability and Written Opinion for PCT/CH2012/000247, dated May 6, 2014.

International Search Report for PCT/CH2012/000251, issued Mar. 13, 2013.

J. Boby, S. Teral, J.M. Caussignac and M. Siffert, "Vehicle Weighing in Motion with Fibre Optic Sensors", pp. 45-47, Measurement + control, vol. 26, Mar. 1993.

* cited by examiner

SENSOR PACKAGE FOR WIM SENSOR AND WIM SENSOR

CROSS-REFERENCE TO RELATED APPLICATIONS

This application claims priority to International Application Serial No. PCT/CH2013/000005, filed Jan. 11, 2013, which claims priority to Swiss Application No. 47/12 filed Jan. 11, 2012. International Application Serial No. PCT/CH2013/000005 is hereby incorporated herein for all purposes by this reference.

FIELD OF THE INVENTION

The invention relates to a sensor package with long design for a WIM (Weigh In Motion) sensor comprising a first receiving plate, a plurality of measuring elements which are arranged equally spaced in a row on the upper side of the first receiving plate, an electrode covering all the measuring elements, insulation completely covering the electrode, and a second receiving plate which covers the insulation, wherein each receiving plate consists of a plurality of receiving elements, the end faces of which are juxtaposed in a row.

BACKGROUND

WIM sensors are sensors between one and several meters long that are installed in the road to measure the dynamic ground reaction forces of vehicles, in order to determine their weight. An essential element of the sensor is the aluminium hollow profile, in which a preloaded sensor package is installed. Mountings provided at the top and bottom ensure an optimal flow of force through the measuring element. The hollow profile comprises a tube part, which is responsible for initial tension and sealing the measuring element. A known hollow profile for such purposes is described for example in U.S. Pat. No. 5,461,924, which is hereby incorporated herein in its entirety for all purposes by this reference.

The measuring elements in the sensor packages are typically piezoelectric. However, other measuring principles, such as resistive, piezoresistive, capacitive, optical or magneto-elastic are also possible. In order to be able to measure using the entire length of the sensor, the measuring elements are arranged at regular intervals along the sensor length. They are spaced at distances of a few centimeters. A sensor package comprises steel receiving plates, one each at the top and bottom, between which an insulation and an electrode foil are arranged. The measuring elements are arranged between the electrode foil and the adjacent receiving plate. Steel receiving plates are necessary to guarantee the required strength and evenness of the quartz receiving. To ensure that measurements can be taken with the same accuracy and sensitivity over the entire length of the WIM sensors, all of the measuring elements must be exposed to precisely the same tension conditions in the hollow profile. This requires a high degree of accuracy not only in the manufacture of the hollow profiles, but also in the sensor packages, the thickness of which must be uniform over the entire length thereof, within a narrow tolerance.

The production of steel receiving plates in the desired length from one to several meters and the required thickness is extremely difficult. The required surface tolerances such as flatness, parallelism, thickness, surface roughness, etc., as the quartz receiving can only be obtained by employing a grinding process that is almost impossible for such lengths, and at all events involves huge effort. The receiving plates are prone to bending and twisting.

A WIM sensor consisting of a plurality of single modules that are aligned to each other, wherein each element includes a sensor that is read out separately, is known from U.S. Pat. No. 5,942,681, which is hereby incorporated herein in its entirety for all purposes by this reference. These individual modules are mounted on a bottom rail. It has been found that the construction is very complicated, because each element must be manufactured, tensioned and sealed individually. Since the WIM sensors are also exposed to environmental influences in the street, the seal loses its sealing quality after a certain time, leading to the failure of individual sensors.

A WIM sensor system with individual elements that have been inserted in a tube is described in U.S. Pat. No. 5,265,481, which is hereby incorporated herein in its entirety by this reference for all purposes. It has proven difficult to insert the sensor elements in the closed tube.

SUMMARY OF THE INVENTION

The object of the present invention is to describe a sensor package of the type described in the introduction for WIM sensors of which kind, and which satisfies the required tolerance, but is less expensive to produce and overcomes the disadvantages mentioned. A correspondingly inexpensive WIM sensor is also to be indicated.

This object is solved by the features described more fully below.

In the configuration according to the invention, adjacent receiving elements are connected to each other by form-fitting connections at their respective end faces. This method of connecting the receiving elements makes it possible to pull the sensor package into the hollow profile. This in turn represents significant advantages for handling and assembly.

The inventive WIM sensor includes a sensor package according to the invention. When installed for use in a road, a force is exerted perpendicularly on the WIM sensor from the road surface.

The receiving elements of the sensor package according to the invention are correspondingly much shorter than a receiving plate of a sensor package according to the prior art, which is constructed as a single part.

These relatively small receiving elements can be produced in large quantities and inexpensively with a suitable tool. For this, they are stamped out under the requisite precision tolerance conditions and then ground inexpensively in standardised procedures. A row of receiving elements is easily formed by juxtaposing a number of receiving elements up to the desired length.

It is much easier and cheaper to produce a large number of small receiving elements with strict specifications regarding flatness and parallelism than to manufacture a few receiving plates one or more meters in length that satisfy the same specifications regarding surface quality. Whereas long receiving plates have proved to be very difficult to produce and consequently the selection of materials that can be used to make them is severely limited, with short receiving elements it is not difficult to satisfy the stringent requirements with desired materials such as stainless steel.

Another significant advantage of the invention is the flexibility in the length of the sensor, since the receiving elements, which are now shorter, can be assembled to the desired length. This reduces the need for product variety and simplifies assembly. It is also possible to build WIM sensors of different lengths, even longer than 2 m, which was not previously possible.

Further variations of the invention are described in greater detail below.

BRIEF DESCRIPTION OF THE DRAWINGS

In the following, the invention will be explained in greater detail with reference to the drawings. In the drawings.

Figure 1:
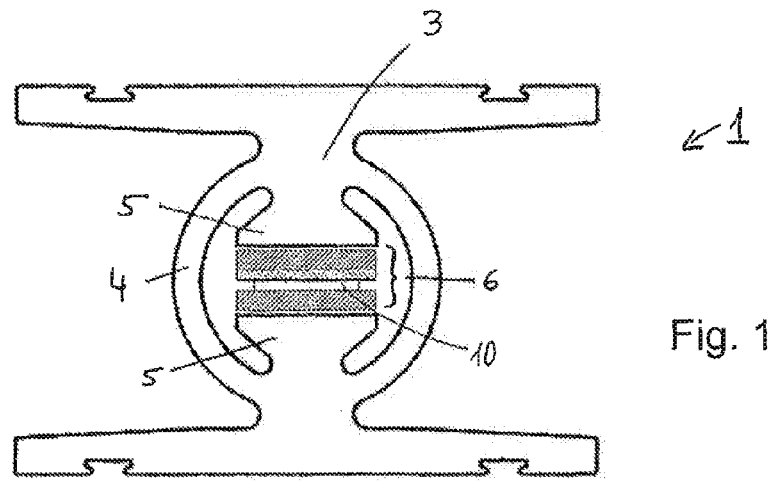
FIG. 1 shows a cross section of a WIM hollow profile including a sensor package.

DESCRIPTION OF EXEMPLARY
EMBODIMENTS OF THE INVENTION

In the following, the invention will be described in greater detail with reference to the figures. The same reference numerals will be used consistently to refer to the same items.

In FIG. 1, a hollow profile 3 of a WIM (Weigh in Motion) sensor 1 is shown in cross section. The height and width of such hollow profiles 3 are usually between 30 and 70 mm, while the length thereof, not shown here, is typically between 1 m and 4 m. Consequently, such hollow profiles 3 may be described as long in comparison to the cross-sectional dimensions thereof.

Hollow profile 3 comprises a central tube 4 and two mountings 5 arranged opposite one another inside the tube. A sensor package 6 is clamped between said mountings 5. Tube 4 ensures that the initial tension is exerted uniformly on sensor package 6 and that sensor package 6 is sealed over the entire length of WIM sensor 1. In operation, a force is absorbed by hollow profile 3 from the outer, non-designated plates and transferred to mountings 5 in tube 4. From there, the force acts on sensor package 6, which is configured as a stack, and is applied to all of the layers thereof, particularly via measuring elements 10 that are arranged flat in the sensor package 6.

Figure 2:
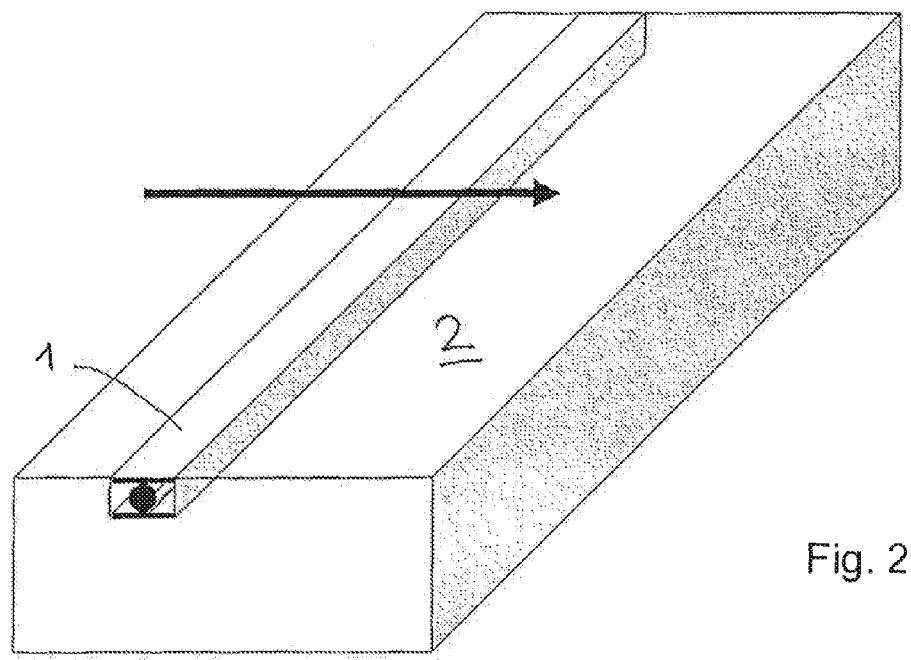
FIG. 2 shows a perspective view of a cross-section of a road with a WIM sensor installed.

FIG. 2 shows a perspective cross section of a road 2, which has a WIM sensor 1 incorporated therein. The upper side of WIM sensor 1 is arranged flush with road surface 2. WIM sensor 1 is aligned transversely to the direction of traffic, which is indicated by an arrow, so that vehicles cross over WIM sensor 1 when passing. If required, several WIM sensors 1 may be arranged in a line so as to cover the entire lane. The WIM sensors 1 can determine the weight of passing vehicles as they pass over the WIM sensors 1. The captured data is forwarded to evaluation stations via links provided for this purpose, but not shown.

To ensure that the weight of a vehicle can always be determined correctly, sensor 1 must be configured identically over its entire length. In particular, the initial tension on the centrally clamped sensor package 6 must match precisely defined specifications at all points.

Figure 3:
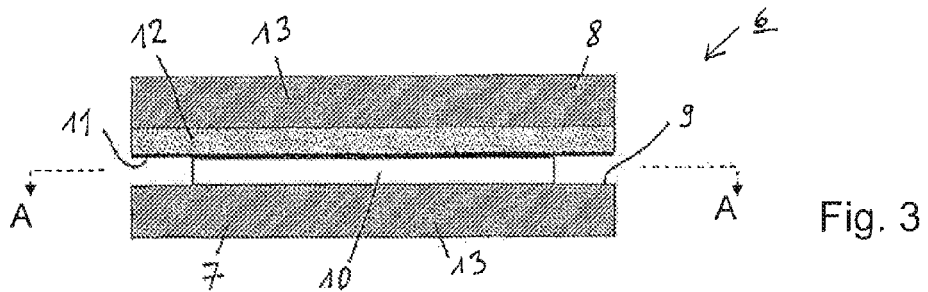
FIG. 3 is an enlarged view of a cross section of a sensor package for a WIM sensor.

FIG. 3 is an enlarged view of a sensor package 6 of a WIM sensor 1 in cross-section. A side view of a longitudinal section of such a sensor package 6 corresponding to the configuration of the invention is shown in FIG. 4.

Sensor package 6 comprises a first receiving plate 7, on which a plurality of measuring elements 10 is disposed. Said measuring elements 10 are arranged equidistantly from each other in a row on upper surface 9 of first receiving plate 7. Said measuring elements 10 are covered directly or indirectly by an electrode 11. Said electrode 11 in turn is completely covered by an insulation 12, which in particular may be configured as a foil or a film. Finally, a second receiving plate 8 covers insulation 12 directly or indirectly, and is the last essential component of sensor package 6.

The components of sensor package 6 listed in the above, in particular the two receiving plates 7, 8, measuring elements 10 and electrode 11 with insulation 12, are all arranged flat, one on top of the other on the respective surfaces thereof, which arrangement demands extremely high quality with regard to flatness, evenness and surface roughness. Suitable dimensions for each of the various surface qualities and/or thicknesses are defined by close tolerances.

Figure 4:
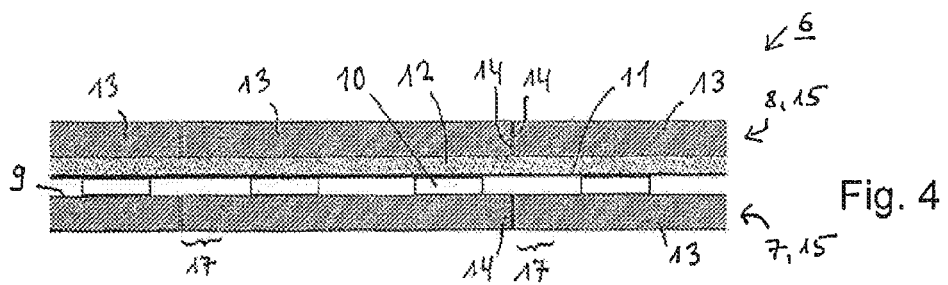
FIG. 4 is a side view of a longitudinal section of a sensor package according to the invention as shown in FIG. 3.

FIG. 4 shows that each receiving plate 7, 8 of sensor package 6 according to the invention consists of a plurality of discrete receiving elements 13, which are disposed in a row 15 with the end faces 14 thereof of adjacent to each other. Unlike the prior art, receiving plates 7, 8 are thus not constructed as a single piece, but are still adjacent to each other. The row of receiving elements 13 is as long as the entire length of sensor package 6.

In particular, all receiving elements 13 of a row 15 are identical to each other. This particularly applies to the choice of material and the surface quality of receiving elements 13. And production costs may be lowered further still if receiving elements 13 are also identical with respect to all dimensions thereof.

Receiving elements 13 are preferably made from stainless steel. This material is ideal in terms of hardness and strength, the properties required to enable machining of the surfaces, and corrosion resistance. Conventional, single-part receiving plates 7, 8 cannot be made from stainless steel.

Figure 5:
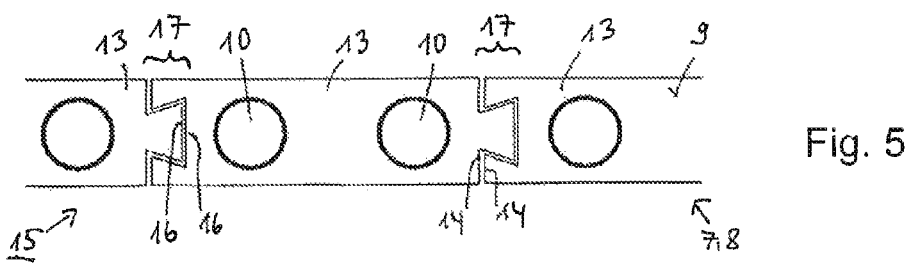
FIG. 5 is a top view of surface A-A of a longitudinal section of an inventive sensor package shown in FIG. 3.

The construction according to the invention is shown in FIG. 5. In this embodiment, inner end faces 14 of receiving elements 13 of at least one row have profiles 16 that engage in form fitting manner in profile 16 of adjacent end faces 14 of adjacent receiving elements 13. This allows positive locking connections 17 to be made between receiving elements 13, thereby transforming row 15 of receiving elements 13 into a chain. This has the advantage that the sensor package may also optionally be pulled between the mountings 5 of a hollow profile 3. For this purpose, a fastening element may be attached to the outer profile 16 of leading receiving element 13 to enable it to be pulled.

Figure 6:
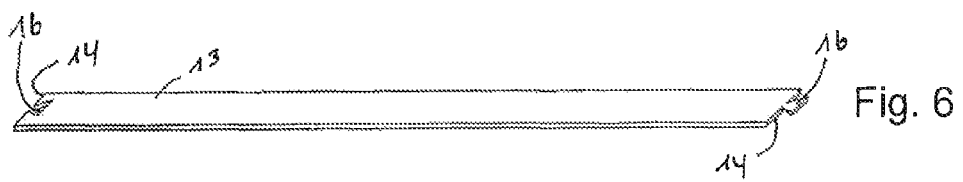
FIG. 6 is a perspective view of a receiving element in the inventive configuration.

FIG. 6 also shows a perspective view of a receiving element 13 according to the invention, with slightly different proportions. This figure also shows that a chain may be created from a plurality of said receiving elements 13 by form fitting connections on profiles 16 of end faces 14. Connecting region 17 is also indicated by a dashed line in FIG. 4. Measuring elements 10 should not be arranged in this connecting region 17.

Receiving elements 13 according to the invention are preferably 60 to 300 mm long, particularly 100 to 150 mm, 5 to 25 mm wide, particularly 8 to 15 mm, and 1 to 6 mm thick, particularly 2 to 2.5 mm. These sizes have proven favourable for simple production. In this way multiple measuring elements 10 can be arranged on each receiving member 13, preferably arranged at a distance of 1 to 10 cm from each other.

According to the invention, the tolerances for thickness and parallelism of all receiving members 13 are not more than 30

μm. This ensures that the total thickness of sensor package 6 satisfies the requirements for measurement accuracy.

In addition, the tolerances for surface flatness of receiving elements 13, facing towards or away from measuring elements 10, must not exceed 50 μm. Both of these inner surfaces face toward measuring elements 10 and must therefore be machined very accurately. When installed, the two outer surfaces are positioned on top of mountings 5 of hollow profile 3, which must also satisfy requirements in respect of flatness.

According to the invention, the roughness value for surfaces 9 of receiving elements 13 adjacent to measuring elements 10 must not exceed 1.6 Ra. This is important to ensure that measuring elements 10 also have a defined, flat support surface.

Preferably, all receiving elements 13 are of identical design. This applies to choice of material, the dimensions and all tolerances of surfaces and thicknesses. This has the advantage that it is not necessary to distinguish between the receiving elements 13 for the first and second receiving plates 7, 8. The same tools can be used for all receiving elements 13. They can all also undergo the same processing steps to obtain the required surface qualities. According to the invention, both surfaces on which receiving elements 13 ultimately rest are of identical construction. In this way, a receiving element 13 cannot be inadvertently fitted the wrong way round during assembly of a sensor package 6 according to the invention.

The invention also relates to a WIM sensor 1 comprising a hollow profile 3 with a tube 4, in which two mountings 5 are arranged facing one another, between which a sensor package 6 according to the invention is arranged under initial tension. Such a WIM sensor 1 is shown in FIG. 1, although this figure does not display sufficiently fine detail to show that receiving plates 7, 8 each consisting of a plurality of receiving elements 13 engage with one another in form fitting manner. Such WIM sensors 1 are significantly less expensive than conventional WIM sensors 1, because the sensor package 6 according to the invention which is used therein is less expensive.

LIST OF REFERENCE NUMERALS

1 WIM (Weigh in Motion) sensor, drive-over sensor
2 Road
3 Hollow profile
4 Tube
5 Mounting
6 Sensor package
7 First receiving plate
8 Second receiving plate
9 Upper side of first receiving plate
10 Measuring element, measurement quartz
11 Electrode
12 Insulation
13 Receiving element
14 Receiving element end face
15 Row of receiving elements
16 Profile of an end face for form fitting connection
17 Form fitting connection, connection area

The invention claimed is:
1. Sensor package with long design for being slidably installed into a hollow profile of a WIM (Weigh In Motion) sensor, the hollow profile including a hollow central tube sealed over the entire length of the WIM sensor and having two internal mountings facing each other for exerting an initial tension uniformly on the sensor package, the sensor package comprising:

a first receiving plate configured for being slidably received within the hollow profile of the WIM sensor and for contacting one of the internal mountings,
a plurality of measuring elements which are arranged equally spaced in a row on the upper side of the first receiving plate,
an electrode that at least indirectly covers all the said measuring elements,
an insulation that completely covers the electrode, and
a second receiving plate which at least indirectly covers the insulation and is configured for being slidably received within the hollow profile of the WIM sensor and for contacting the other one of the internal mountings,
wherein each receiving plate includes a plurality of discrete receiving elements, each opposite end of each receiving element having an end face, the end faces of the receiving elements are juxtaposed in a row,
wherein the inner end faces of the receiving elements have profiles that engage in positive locking manner in the profiles of the adjacent end faces of adjacent receiving elements.

2. Sensor package according to claim 1, wherein all receiving elements of a row are identical to each other.

3. Sensor package according to claim 1, wherein the receiving elements are made from stainless steel.

4. Sensor package according to claim 1, wherein the receiving elements have a length from 60 to 300 mm, a width from 5 to 25 mm, and a thickness from 1 to 6 mm.

5. Sensor package according to claim 4, wherein the receiving elements have a length from 100 to 150 mm.

6. Sensor package according to claim 4, wherein the receiving elements have a width from 8 to 15 mm.

7. Sensor package according to claim 4, wherein the receiving elements have a thickness from 2 to 2.5 mm.

8. Sensor package according to claim 1, wherein the tolerance for thickness and parallelism of all receiving elements is not more than 30 μm.

9. Sensor package according to claim 1, wherein the tolerance for flatness of the surfaces of receiving elements, whether facing toward or away from measuring elements, is not more than 50 μm.

10. Sensor package according to claim 1, wherein the roughness of the surfaces of the receiving elements adjacent to the measuring elements has a value not exceeding Ra 1.6.

11. Sensor package according to claim 1, wherein all receiving elements are of identical design.

12. Sensor package according to claim 1, wherein the receiving elements have a length from 100 to 150 mm, a width from 8 to 15 mm, and a thickness from 2 to 2.5 mm.

13. Sensor package according to claim 1, wherein the first receiving plate has opposing surfaces respectively facing towards and away from the measurement elements, and these opposing surfaces are parallel.

14. Sensor package according to claim 1, wherein the profiles are of the dovetail type.

15. A WIM (Weigh in Motion) sensor comprising:
a hollow profile,
a tube and two mountings disposed opposite to one another in the hollow profile,
a sensor package arranged under initial tension within the tube and between the two mountings, the sensor package including a first receiving plate, a plurality of measuring elements which are arranged equally spaced in a row on the upper side of the first receiving plate, an electrode at least indirectly covers all the said measuring elements, an insulation that completely covers the electrode, and a second receiving plate which at least indirectly covers the insulation, wherein each receiving plate includes a plurality of discrete receiving elements, each opposite end of each receiving element having an end face, the end faces of the receiving elements are juxtaposed in a row, wherein the inner end faces of the receiving elements have profiles that engage in positive locking manner in the profiles of the adjacent end faces of adjacent receiving elements.

16. WIM Sensor according to claim 15, wherein the first receiving plate has opposing surfaces respectively facing towards and away from the measurement elements, and these opposing surfaces are parallel.

17. WIM Sensor package according to claim 15, wherein the profiles are of the dovetail type.

18. Sensor package with long design for a WIM (Weigh In Motion) sensor having a separate hollow profile that has a hollow central tube sealed over the entire length of the WIM sensor and that has two internal mountings facing each other for exerting an initial tension uniformly on the sensor package, the sensor package being separate from the hollow profile of the WIM sensor, the sensor package comprising:

a first receiving plate configured for being slidably received within the hollow profile of the WIM sensor and for contacting one of the internal mountings, a plurality of measuring elements which are arranged equally spaced in a row on the upper side of the first receiving plate, an electrode that at least indirectly covers all the said measuring elements, an insulation that completely covers the electrode, and a second receiving plate which at least indirectly covers the insulation and is configured for being slidably received within the hollow profile of the WIM sensor and for contacting the other one of the internal mountings, wherein each receiving plate includes a plurality of discrete receiving elements, each opposite end of each receiving element having an end face, the end faces of the receiving elements are juxtaposed in a row, wherein the inner end faces of the receiving elements have profiles that engage in positive locking manner in the profiles of the adjacent end faces of adjacent receiving elements.

* * * * *